United States Patent [19]

Grachtrup

[11] Patent Number: 4,488,730
[45] Date of Patent: Dec. 18, 1984

[54] DEVICE FOR SEALING A RING GEAR

[75] Inventor: Heinz Grachtrup, Ennigerloh, Fed. Rep. of Germany

[73] Assignee: Krupp Polysius AG, Beckum, Fed. Rep. of Germany

[21] Appl. No.: 499,272

[22] Filed: May 31, 1983

[30] Foreign Application Priority Data

Jun. 23, 1982 [DE] Fed. Rep. of Germany ....... 3223444

[51] Int. Cl.³ .............................................. F16H 57/04
[52] U.S. Cl. ...................................... 277/18; 74/467; 184/6.12; 277/237 R
[58] Field of Search ................. 74/467, 468; 184/6.12; 277/1, 11, 18, 237 R

[56] References Cited

U.S. PATENT DOCUMENTS

| | | | |
|---|---|---|---|
| 2,314,595 | 3/1943 | Patterson | 184/6.12 |
| 2,470,960 | 5/1949 | Tremolada | 277/18 |
| 3,601,515 | 8/1971 | Pelizzoni | 74/467 |
| 4,347,759 | 9/1982 | Renk et al. | 74/467 |
| 4,399,337 | 8/1983 | Annis | 277/237 R |
| 4,402,516 | 9/1983 | Gans et al. | 277/237 R |
| 4,414,861 | 11/1983 | Witt | 74/467 |

Primary Examiner—Robert I. Smith
Attorney, Agent, or Firm—Learman & McCulloch

[57] ABSTRACT

A ring gear mounted for rotation and driven by a pinion which dips into an oil bath is provided on each face with a sealing device. Each sealing device has a conical annulus tapering in a direction away from the ring gear and on which a ring is positioned in spaced relation with the gear. There thus is formed between the gear and each ring an annular oil collecting chamber which leads oil carried upwards by the ring gear back into the oil bath.

16 Claims, 4 Drawing Figures

DEVICE FOR SEALING A RING GEAR

BACKGROUND OF THE INVENTION

The invention relates to a device for sealing a ring gear which is driven by a pinion which dips into an oil bath.

Large rotating machine parts, such as rotary kilns, tube mills, rotary dryers and the like, are predominantly driven by means of ring gears which are mounted on their outer periphery and pinions which engage therewith and which are in turn part of a drive assembly. A proportion of the lubrication oil is transferred to the teeth of the ring gear by the driving pinion running in an oil bath. While a proportion of the transferred oil drips off of the half of the ring gear located at the lowest point at that time and can flow back into the oil bath, the remaining quantity of oil is carried with the teeth of the ring gear into the region above the axis of rotation of the ring gear. There is then a danger that the oil may flow off along the body of the ring gear as far as the casing of the rotary kiln and this can result not only in greater oil losses (through vaporisation), but as a consequence of the relatively high casing temperature (even up to approximately 400° C. in case of breakdown) there can be a considerable danger of fire.

For the reasons set out above efforts have been made to provide appropriate sealing arrangements in the region of the ring gear so as to prevent flowing off of the entrained oil in the direction of the body of the ring gear or the casing of the rotary kiln.

In a construction which is known in the art and is intended especially for sealing a ring gear mounted on a rotary kiln casing, rings of circular cylinder shape which are at least partially enclosed by stationary sheet metal strips are provided in the region of the end faces of the ring gear. During operation the circular cylindrical ring slides along the sheet metal strip and together with the latter forms the actual seal. It should be borne in mind here, however, that in the case of rotating drums concentricity errors (height and tumbling motion out of true), axial movements of the ring gear and alterations caused by thermal stresses can occur, which can have very serious effects in the case of rotary kilns. Even if such errors and movements can to some extent be accommodated resiliently, it is not possible to prevent uncontrolled lubrication conditions occurring as a result of the given relative rotational movements of the essential sealing elements, and this can lead to undesirably severe wear.

SUMMARY OF THE INVENTION

An object of the invention is to provide a sealing device of the type described which ensures reliable and durable sealing with relatively simple construction even in the case of the aforementioned concentricity errors, axial movements, and thermal stresses, such as occur especially in rotary kilns and similar rotating drums.

This object is achieved according to the invention by the following features:

(a) a frusto-conical annulus which tapers in a direction away from the ring gear is connected to each of the two opposite faces of the ring gear;

(b) a sealing ring is arranged on each conical annulus in such a way that an annular oil collecting chamber which leads the oil back into the oil bath is formed between the sealing ring and the adjacent face of the ring gear.

In a construction according to the invention the cones provided on both end faces of the ring gear ensure that the oil taken up by the teeth of the ring gear is carried particularly to the section of the body of the ring gear which is at that time located above the axis of rotation of the ring gear. The provision of the sealing ring on each cone prevents the oil flowing off along the outside of the cone from flowing onto the casing of the rotary kiln. The construction of the annular oil collecting chamber ensures that the oil running off of the teeth is reliably led back into the oil bath. The structurally relatively simple coordination of each cone with its associated sealing ring also avoids all the problems which can occur in the known sealing apparatus described above as a result of concentricity errors, axial movement of the ring gear, and thermal stress.

DESCRIPTION OF THE DRAWINGS

Further details and advantages of the invention are disclosed in the following description and in the accompanying drawings, in which.

DETAILED DESCRIPTION

Figure 1:
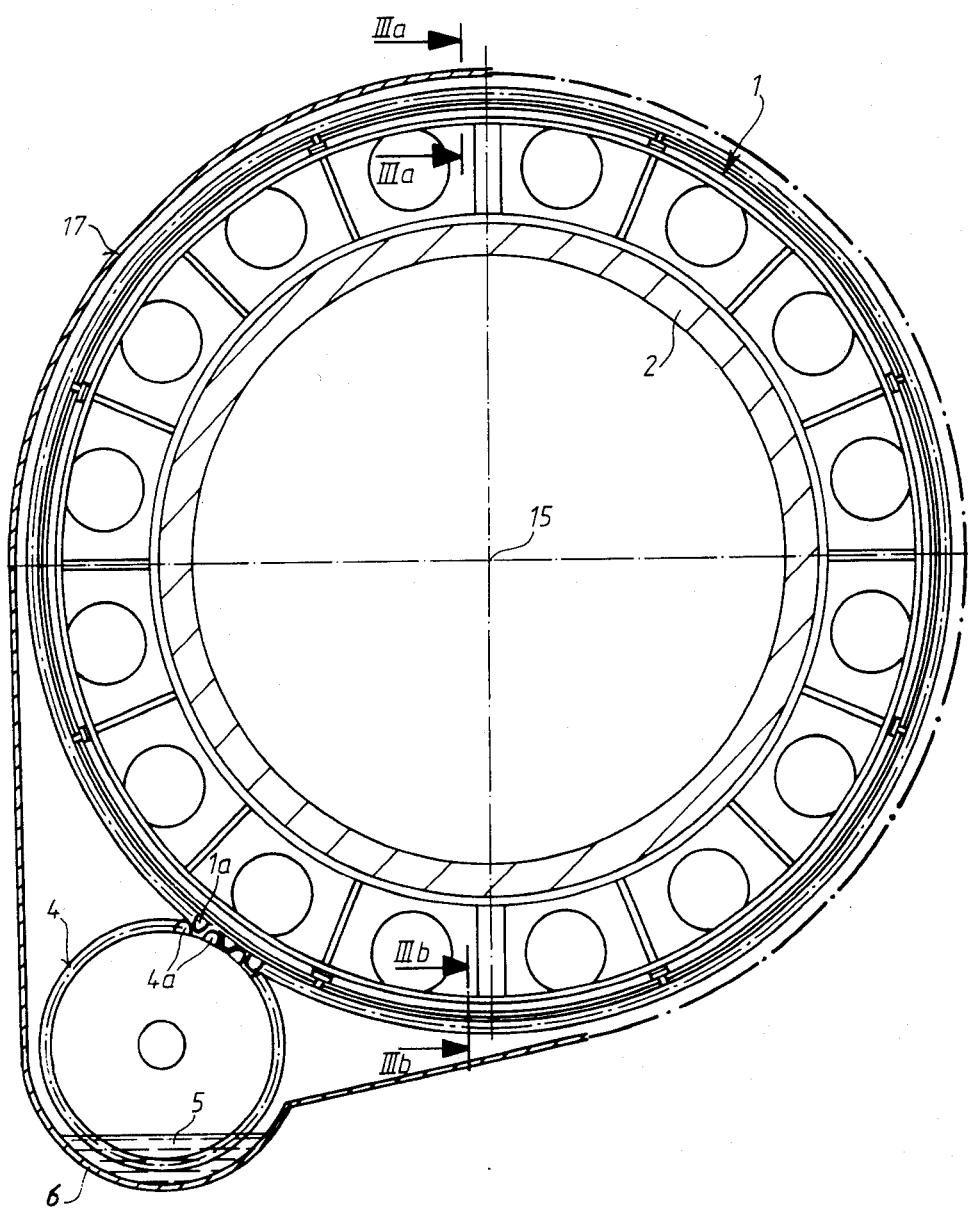
FIG. 1 is a simplified cross sectional view through a rotary drum in the region of the ring gear arranged thereon.

It may be assumed that the ring gear 1 is mounted in the usual way on the casing 2 of a rotary kiln 3 for rotation about a substantially horizontal axis.

The teeth 1a of the ring gear 1 mesh with the teeth 4a of a driving pinion 4 which in a known manner forms part of a drive assembly (not shown in greater detail) and dips into an oil bath 5 which is located in an oil collecting chamber incorporated in an oil sump 6.

Figure 2:
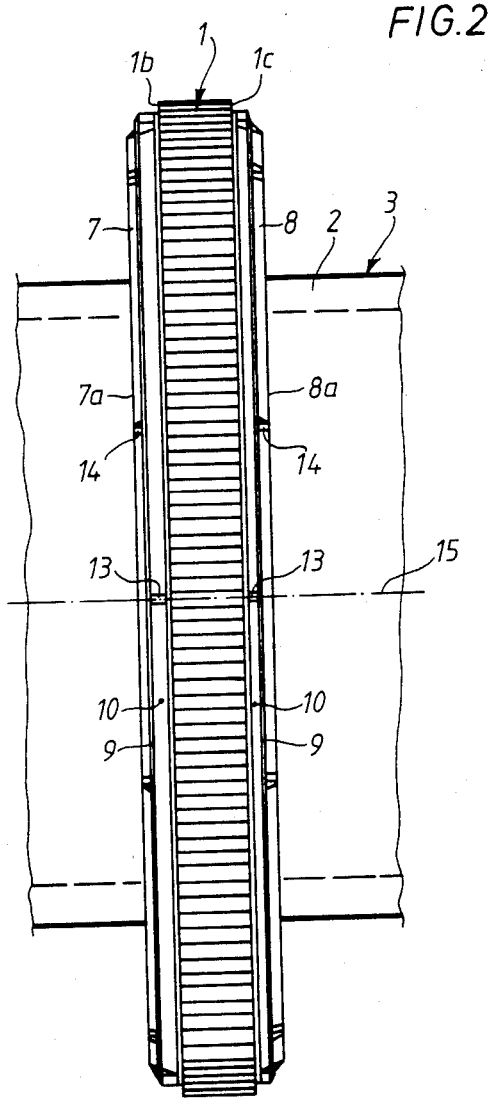
FIG. 2 is a fragmentary side view of a longitudinal portion of a rotary drum, especially the ring gear.

A conical annulus 7 has its large diameter end screwed to the gear 1 at one side 1b thereof and a conical annulus 8 is similariy fixed to the gear 1 at its opposite side 1c. The small diameter ends 7a and 8a of the respective conical annuli therefore are remote from the ring gear. A sealing ring 9 is loosely mounted, see FIGS. 2 and 3a, 3b, on each cone 7, 8. This arrangement is chosen so that between the sealing ring 9 and the adjacent end face 1b or 1c of the ring gear 1 an annular oil collecting chamber 10 is formed through which the oil which has been carried upwards by the teeth 1a of the ring gear 1 can be led back into the oil bath.

The two cones 7, 8 are of similar construction and are connected in a corresponding manner to the associated end face of the ring gear. Consequently, for the more detailed explanation as regards shape, construction, and coordination of ring gear, cone and sealing ring the description below will merely deal with the parts mounted on the end face 1c of the ring gear with the cone 8, corresponding to the illustrations in FIGS. 3a, 3b.

On its surface having the greater diameter the cone 8 has a ring flange 11 with which it is screwed onto the appropriate end face 1c of the ring gear 1, as indicated at 12.

The internal diameter Di of sealing ring 9 is somewhat greater than the external diameter of the cone 8 at the zone at which the sealing ring 9 is positioned on the cone. Since the ring 9 is loosely mounted on the cone it is free to move radially of the cone. Thus, the upper peripheral region the sealing ring 9 seats on and is supported on the outer surface of the cone 8 (FIG. 3a), while in the lower peripheral region there is a space S between the ring and the outer surface of the cone 8 which is sufficiently large for any oil which has reached the outer peripheral section of the cone 8 outside the oil collecting chamber 10 to flow back inwards unhindered. In order to ensure that the loosely mounted sealing ring 9 is prevented from sliding off of the cone 8 in the axial direction, on both end faces of the sealing ring 9 a number of locating or spacer elements 13 or 14 distributed over the periphery are mounted on the cone 8. In the illustrated embodiment pin-like locating or spacer elements 13 which project axially against the sealing ring 9 are mounted on the ring flange 11 on the one hand while on the other hand—on the opposing end face of the sealing ring 9—are approximately upright spacer elements 14 (for instance in the form of spacer plates) are mounted directly on the corresponding outer peripheral surface of the cone 8, and having a radial height such as to engage the ring. These spacer elements 13, 14 cooperate with the sealing ring 9 or the end faces thereof so that the sealing ring is capable of limited movement in the radial direction but is secured in the axial direction against sliding off of the cone 8. Each cone ring 9 is therefore essentially aligned in a plane which runs at right angles to the axis of rotation 15 (see FIGS. 1 and 2).

Each sealing ring 9 has a ring-shaped sealing lip 16 in the region of its inner periphery. This sealing lip 16, which is made from a suitable flexible material (rubber or rubber-like plastic), has the cross sectional shape of an angle one side 16a of which lies flat on the end face of the sealing ring 9 facing the ring gear 1 and is screwed together with it, while the other side 16b is directed approximately axially towards the end face 1c of the ring gear facing it and rests so as to form a seal on the outer surface of the cone 8 in the peripheral region located at that time above the axis of rotation 15 of the ring gear; at least in the lowest peripheral region of the sealing ring 9 the side 16b of the sealing lip 16 is an appropriate distance from the outer surface of the cone.

Figure 3A:
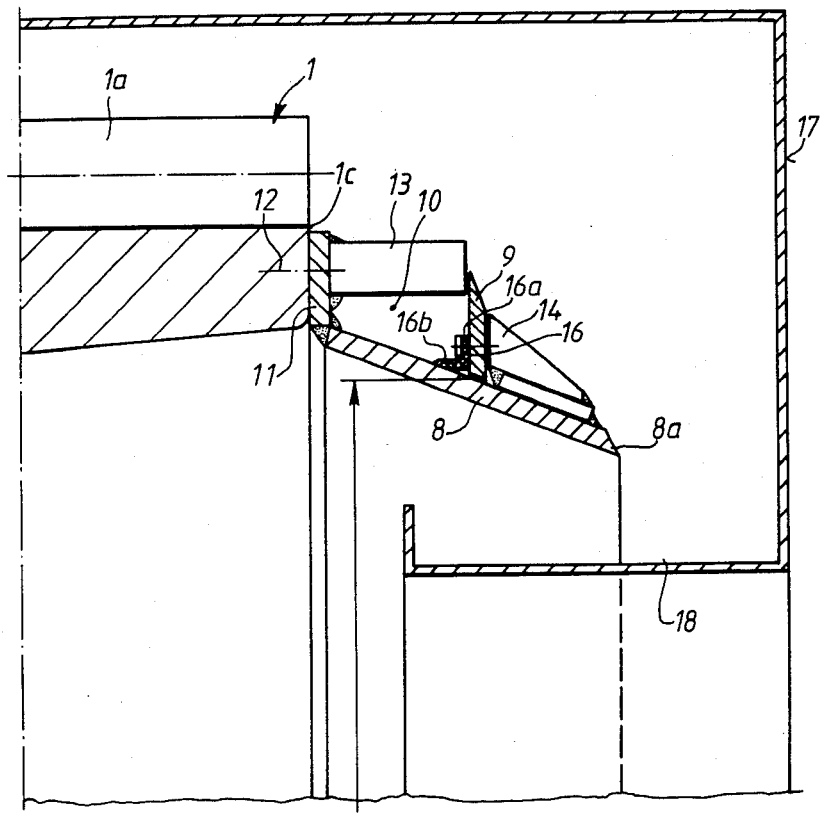
FIGS. 3a and 3b are fragmentary cross sectional views through the ring gear, one in the region of the uppermost peripheral section and the other in the region of the lowest peripheral section, the views being taken on the lines IIIa—IIIa and IIIb—IIIb of FIG. 1.

With reference to FIGS. 1 and 3a an advantageous embodiment of the sealing device for the ring gear 1 will now be described. The ring gear 1 and the cones 7, 8 (including sealing rings 9) mounted on the two end faces 1b and 1c of the ring gear are surrounded over the greater part of their periphery by a fixed protective cover 17. This cover 17 is connected in its lower region to the oil sump 6 or its lower region is constructed as the oil sump 6. Together with the oil sump 6 the cover 17 thus almost completely encloses the ring gear, as is indicated in FIG. 1 partially as a sectional view and partially in purely schematic form (dot-dash lines).

FIG. 3a also shows that it is advantageous for the protective cover 17, at least in the upper region, i.e., in the region of the half of the ring gear located at that time above the axis of rotation 15 of the ring gear, to be constructed in such a way that it has an arcuate, axially extending channel-like section 18 which underlies the upper part of the relevant cone 8. The channel section merges with the lower side walls of the cover 17 which lead to the sump 6.

A protective cover 17 constructed and arranged as described above can thus fulfill a number of functions simultaneously:

it protects the ring gear 1 against external dirt;

it leads oil flowing off the annular oil collecting chamber 10 towards the exterior of the ring gear 1 back into the oil bath 5;

in the event that the sealing ring or the sealing lip 16 thereof should actually fail to form a seal, then oil dripping off the conical surface 8a having the smaller diameter is collected by the channel-like sections 18 and also led back to the oil bath without this oil being lost or reaching the hot kiln casing.

Figure 3B:
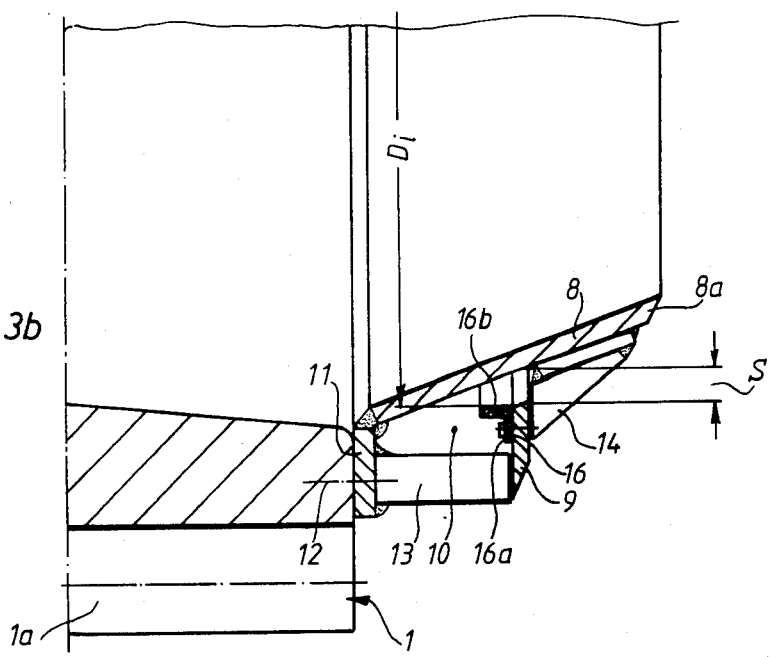

As regards the illustration in FIG. 3b, it should be emphasised that the lower section of the ring gear illustrated here is also enclosed by the protective cover 17, but the cover has been omitted in order to give a clearer representation of the parts illustrated.

Finally, it should be mentioned that the ring gear sealing device according to the invention has been described in connection with a rotary kiln because in such a construction the special advantages of the invention are particularly apparent. Naturally, a sealing device according to the invention can also be used in a similar manner with other rotating machine parts, especially with the rotating drums of tube mills, rotary dryers or rotary coolers and the like.

I claim:

1. A sealing device for a rotary ring-like member mounted for rotation about a substantially horizontal axis by means of a rotary drive which dips into an oil bath, said device comprising a conical annulus having its large diameter end fixed to said member radially inwardly of its periphery; a ring encircling said annulus; and locating means engaging said ring and positioning the latter on said annulus at a zone axially spaced from said member, thereby forming an annular oil collecting chamber between said member and said ring.

2. A sealing device according to claim 1 wherein the internal diameter of said ring is greater than the external diameter of said annulus at said zone.

3. A sealing device according to claim 2 wherein said locating means enables movement of said ring radially of said annulus.

4. A sealing device according to claim 3 wherein said locating means precludes movement of said ring axially of said annulus in a direction away from said member.

5. A sealing device according to claim 1 including an annular seal carried by said ring for engagement with said annulus.

6. A sealing device according to claim 5 wherein said seal is positioned between said ring and said member.

7. A sealing device according to claim 5 wherein said seal has a flange attached to said ring and a lip projecting axially from said flange.

8. A sealing device according to claim 1 wherein said locating means comprises abutments carried by said annulus and extending radially outwardly thereof a distance to engage said ring on that side of the latter axially remote from said member.

9. A sealing device according to claim 8 wherein said locating means comprises spacers carried by said member and projecting axially therefrom for engagement with that side of said ring which confronts said member.

10. A sealing device according to claim 1 wherein said locating means comprises spacers carried by said member and projecting axially therefrom for engagement with that side of said ring which confronts said member.

11. A sealing device according to claim 1 including a protective cover encircling said member and said annulus.

12. A sealing device according to claim 11 wherein said protective cover has walls which overlie and communicate with said oil bath.

13. A sealing device according to claim 12 wherein said cover has other walls which extend axially of said annulus and radially inwardly thereof.

14. A sealing device for a toothed, rotary ring gear rotatable about a substantially horizontal axis by means of a toothed pinion in mesh with said gear and which dips into an oil bath, said sealing device comprising a pair of conical annuli one of which has its large diameter end fixed to one side of said gear radially inwardly of its periphery and the other of which has its large diameter end fixed to the opposite side of said gear radially inwardly of its periphery; a pair of rings, one of which encircles one of said annuli and the other of which encircles the other of said annuli; first locating means engaging one of said rings and positioning the latter on its associated annulus in a position axially spaced from said gear; and second locating means engaging the other of said rings and positioning the latter on its associated annulus in a position axially spaced from said gear, said ring forming an annular oil collecting chamber in each side of said gear.

15. A sealing device according to claim 14 wherein the internal diameter of each of said rings in greater than the external diameter of the associated annulus at said zone.

16. A sealing device according to claim 15 wherein the locating means for each of said rings enables movement thereof radially of its associated annulus, thereby enabling each of said rings to bear upon the associated annulus at a level above that of the axis of rotation of said gear.

* * * * *